(12) United States Patent
Reid

(10) Patent No.: US 9,191,627 B1
(45) Date of Patent: Nov. 17, 2015

(54) AUTOMOBILE THEFT PREVENTION AND RECOVERY SYSTEM

(76) Inventor: Donald J. Reid, Smithtown, NY (US)

(*) Notice: Subject to any disclaimer, the term of this patent is extended or adjusted under 35 U.S.C. 154(b) by 650 days.

(21) Appl. No.: 13/563,346

(22) Filed: Jul. 31, 2012

Related U.S. Application Data

(63) Continuation-in-part of application No. 12/541,025, filed on Aug. 13, 2009, now abandoned.

(51) Int. Cl.
   *H04N 7/18* (2006.01)
   *B60R 25/102* (2013.01)
   *B60R 1/00* (2006.01)

(52) U.S. Cl.
   CPC ............... *H04N 7/18* (2013.01); *B60R 25/102* (2013.01); *B60R 1/00* (2013.01)

(58) Field of Classification Search
   CPC   B60R 25/1025; B60R 25/305; B60R 25/257;
         B60R 25/25; B60R 2300/102; B60R 25/045;
         B60R 25/04; B60Q 1/24; B60Q 5/006;
         G06K 9/00791; G06F 21/554; G06F 21/74;
         G06F 21/88; G06F 21/86; H04L 63/101;
         H04L 63/108; G08B 5/228; H04B 5/0031;
         H04B 5/0037; H04B 5/0081; H02J 5/005;
         G05B 15/02; H02K 1/2766
   USPC ......................................................... 348/148
   See application file for complete search history.

(56) References Cited

U.S. PATENT DOCUMENTS

| | | | |
|---|---|---|---|
| 3,898,472 A * | 8/1975 | Long ............................. 180/270 |
| 4,866,422 A | 9/1989 | Dunnett et al. |
| 5,027,104 A | 6/1991 | Reid |
| 6,002,326 A * | 12/1999 | Turner ....................... 340/426.1 |
| 6,028,506 A | 2/2000 | Xiao |
| D433,645 S | 11/2000 | Hanson |
| 6,147,598 A | 11/2000 | Murphy et al. |
| 6,323,761 B1 | 11/2001 | Son |
| 6,480,098 B2 | 11/2002 | Flick |
| 6,768,420 B2 | 7/2004 | McCarthy et al. |
| 7,355,506 B2 * | 4/2008 | Chandley ..................... 340/5.31 |
| 8,164,418 B2 * | 4/2012 | Li ................. 340/5.72 |
| 8,334,760 B2 * | 12/2012 | Tanaka et al. .............. 340/426.1 |
| 2003/0071899 A1 | 4/2003 | Joao |
| 2003/0090371 A1 * | 5/2003 | Teowee et al. ........... 340/426.24 |
| 2003/0142849 A1 * | 7/2003 | Lemelson et al. ............ 382/104 |
| 2004/0044455 A1 * | 3/2004 | Ante et al. ...................... 701/45 |
| 2004/0075540 A1 * | 4/2004 | Yasui ......................... 340/426.1 |
| 2004/0107028 A1 * | 6/2004 | Catalano ........................... 701/2 |
| 2005/0001716 A1 * | 1/2005 | Yamashita et al. ............ 340/442 |
| 2005/0093683 A1 * | 5/2005 | Wee et al. ................. 340/426.1 |
| 2005/0093686 A1 * | 5/2005 | LeMense et al. ............. 340/442 |
| 2005/0107932 A1 * | 5/2005 | Bolz et al. ....................... 701/45 |

(Continued)

*Primary Examiner* — Shan Elahi

(57) ABSTRACT

A security monitoring, theft (and vandalism) prevention, and recovery system for automobiles includes an exterior light housing camera, an interior passenger cabin camera bar with an interior passenger cabin camera located within, an automatic release air valve located in a valve stem of an automobile wheel and tire assembly, and an automatic seatbelt immobilizing lock located in a seatbelt latch of an automobile. Upon detection of an invasive activity, an intrusion sensor provides an activation signal to a microprocessor. The exterior light housing camera and the interior passenger cabin camera are activated by the microprocessor to provide a video signal to the microprocessor via an activation signal. The quick release air valve and the seatbelt immobilizing lock are activated by the microprocessor to release air pressure from the wheel and tire and immobilize the seatbelt latch, respectively.

15 Claims, 6 Drawing Sheets

(56) References Cited

U.S. PATENT DOCUMENTS

| | | |
|---|---|---|
| 2006/0200258 A1* | 9/2006 | Hoffberg et al. ................ 700/86 |
| 2006/0208864 A1* | 9/2006 | Nantz et al. .................. 340/447 |
| 2006/0244577 A1* | 11/2006 | Tanaka et al. ................. 340/429 |
| 2007/0025597 A1 | 2/2007 | Breed et al. |
| 2007/0136078 A1* | 6/2007 | Plante .............................. 705/1 |
| 2008/0002027 A1 | 1/2008 | Kondo et al. |
| 2008/0122597 A1* | 5/2008 | Englander ..................... 340/433 |
| 2008/0316314 A1 | 12/2008 | Bedell et al. |
| 2009/0109008 A1* | 4/2009 | Kuo et al. ................ 340/426.18 |
| 2009/0293960 A1* | 12/2009 | Tzarum et al. ............. 137/68.13 |
| 2010/0188199 A1* | 7/2010 | Tanaka et al. ............. 340/426.1 |

* cited by examiner

AUTOMOBILE THEFT PREVENTION AND RECOVERY SYSTEM

CROSS REFERENCE

This application claims priority to U.S. non-provisional application Ser. No. 12/541,025 filed Aug. 13, 2009 as a continuation-in-part, the specification of which is incorporated herein by reference in its entirety.

BACKGROUND OF THE INVENTION

Motor vehicle theft is a term used for the criminal act of stealing or attempting to steal a motor vehicle such as an automobile, truck, bus, motorcycle, snowmobile, or trailer. Nationwide in the US in 2005, there were an estimated 1.2 million motor vehicle thefts with property losses estimated at $7.6 billion. There are many different types of anti-theft devices currently in the market to prevent or at least minimize motor vehicle theft losses including car alarms, steering wheel locks, brake pedal locks, wheel locks, and ignition immobilizers. While each of these devices has brought a level of success in reducing motor vehicle theft, using more than one method or device in combination is known to compound the effectiveness. The present invention features a security monitoring, theft (and vandalism) prevention, and recovery system for automobiles that captures video footage of a perpetrator and surrounding landmarks during a theft, restricts the mobility of the automobile, and restrains the perpetrator.

SUMMARY

The present invention features a security monitoring, theft (and vandalism) prevention, and recovery system for automobiles that captures video footage of a perpetrator and surrounding landmarks during a theft, restricts the mobility of the automobile, and restrains the perpetrator. In some embodiments, the system comprises a control system having a microprocessor, a transceiver and an intrusion sensor.

In some embodiments, the system comprises an exterior light housing camera located in an exterior light housing of an automobile. In some embodiments, the system comprises an interior passenger cabin camera bar having an interior passenger cabin camera located within. In some embodiments, the interior passenger cabin camera bar is located inside the passenger cabin of an automobile.

In some embodiments, the system comprises an automatic release air valve located in a valve stem of an automobile wheel and tire assembly. In some embodiments, the automatic release air valve is activated to release pressurized air located within the wheel and tire assembly. In some embodiments, the system comprises an automatic seatbelt immobilizing lock located on a seatbelt latch of an automobile. In some embodiments, the seatbelt immobilizing lock is activated to engage (and prohibit release of) the seatbelt latch.

In some embodiments, upon detection of an invasive activity, the intrusion sensor provides an activation signal to the microprocessor. In some embodiments, the exterior light housing camera and the interior passenger cabin camera located within the interior passenger cabin camera bar are activated by the microprocessor to provide a video signal to the microprocessor. In some embodiments, the quick release air valve and the seatbelt immobilizing lock are activated by the microprocessor to release air pressure from the wheel and tire and immobilize the seatbelt latch, respectively.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
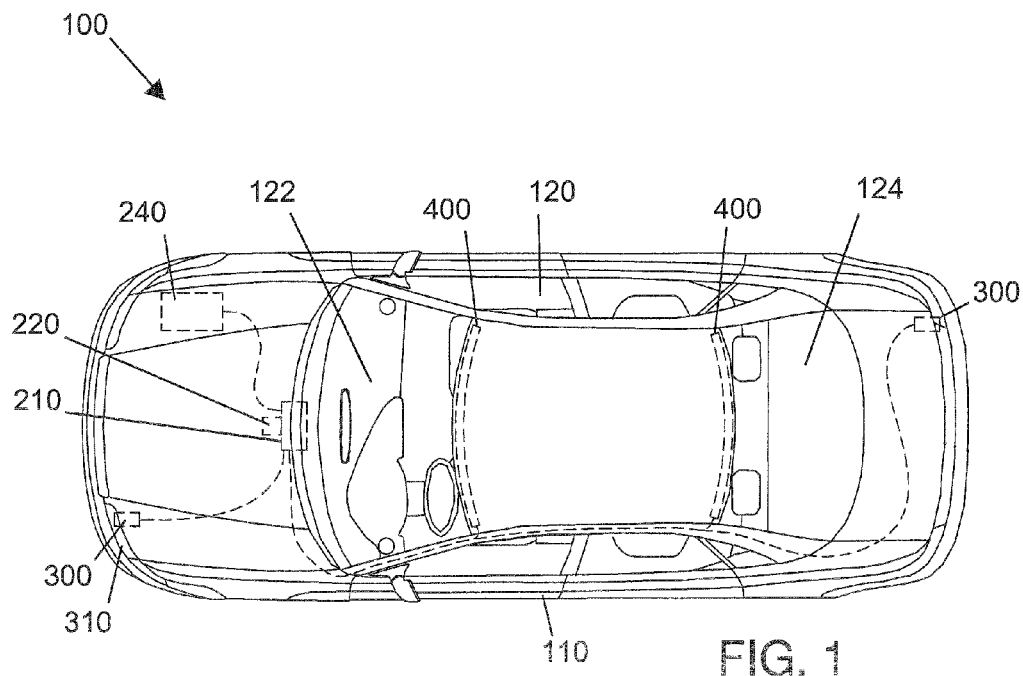
FIG. 1 is an overhead view of the present invention.
Figure 2:
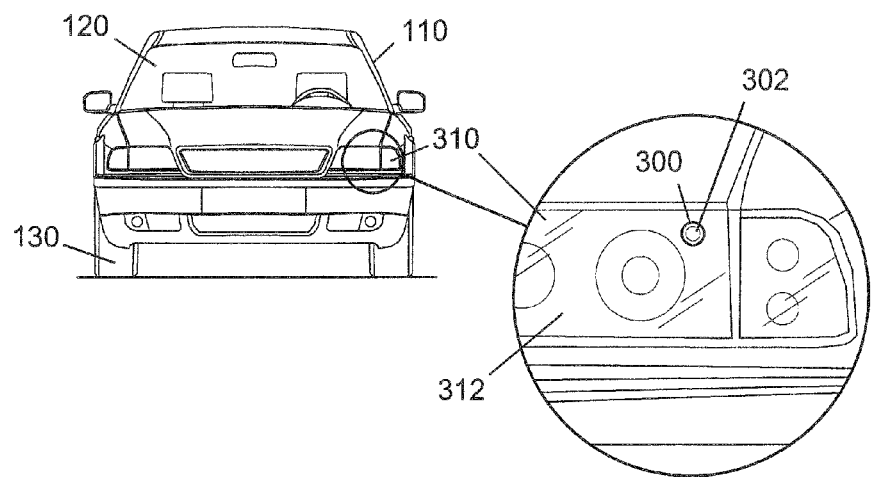
FIG. 2 is a magnified view of the exterior light housing camera of the present invention.
Figure 3:
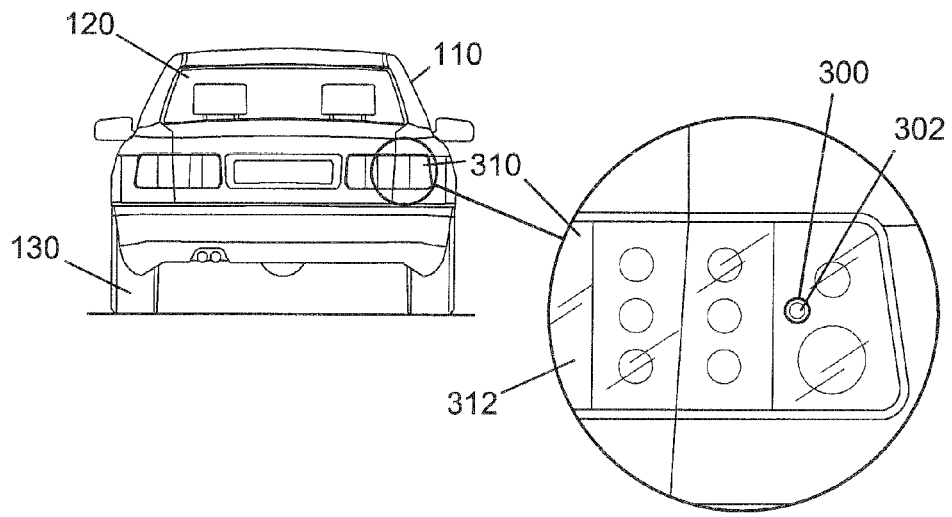
FIG. 3 is a magnified view of the exterior light housing camera of the present Invention.
Figure 4:
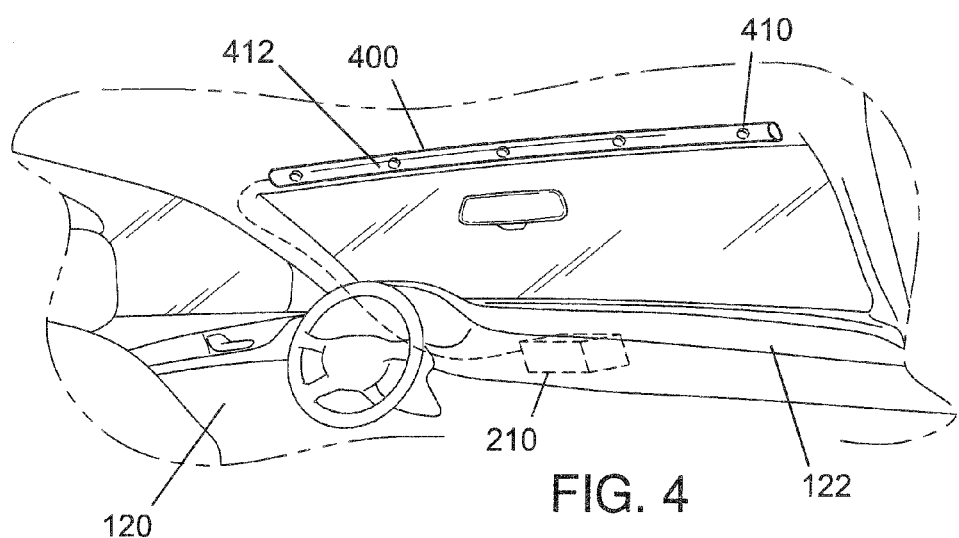
FIG. 4 is a perspective view of the interior passenger cabin camera bar of the present invention.
Figure 5:
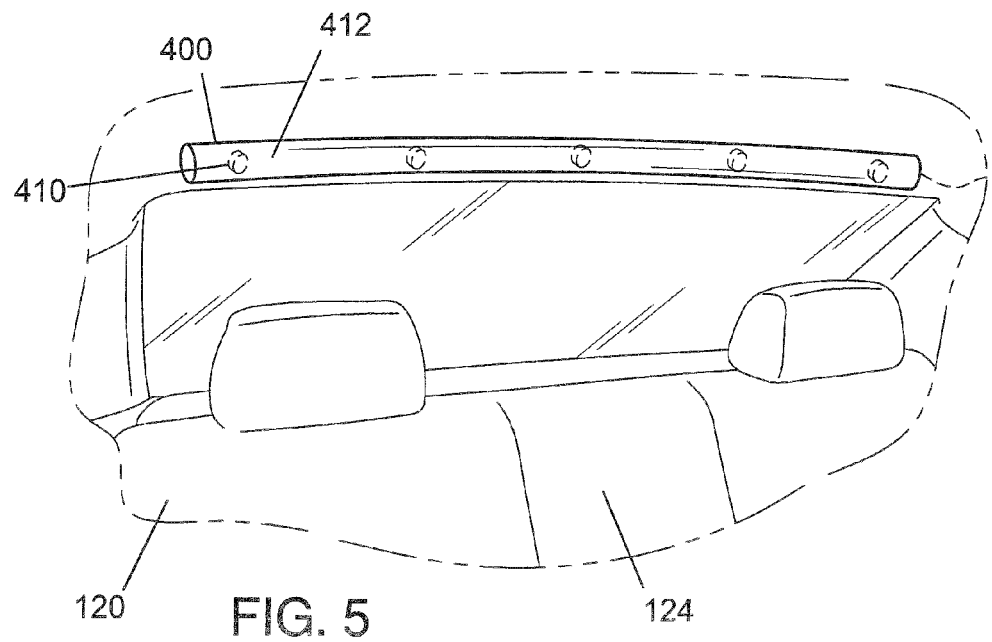
FIG. 5 is a perspective view of the interior passenger cabin camera bar of the present invention.
Figure 6:
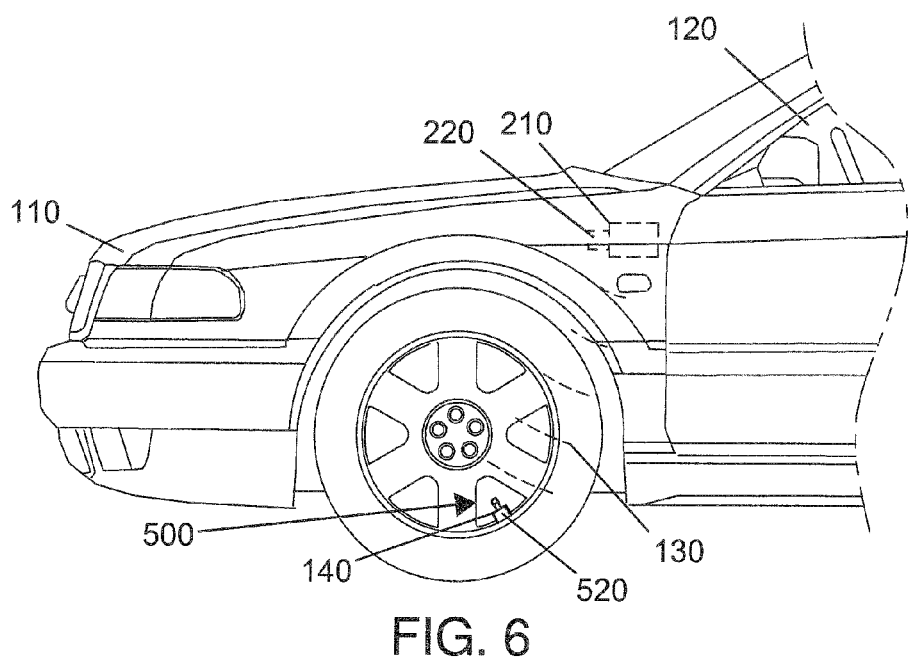
FIG. 6 is a perspective view of the automatic release air valve of the present invention.
Figure 7:
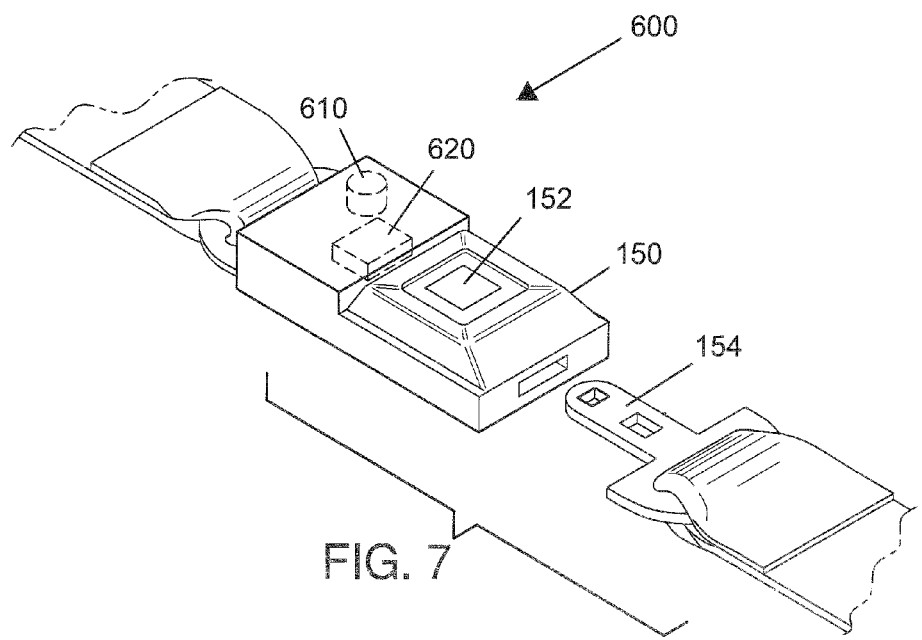
FIG. 7 is a perspective view of the automatic seatbelt immobilization lock of the present invention.
Figure 8:
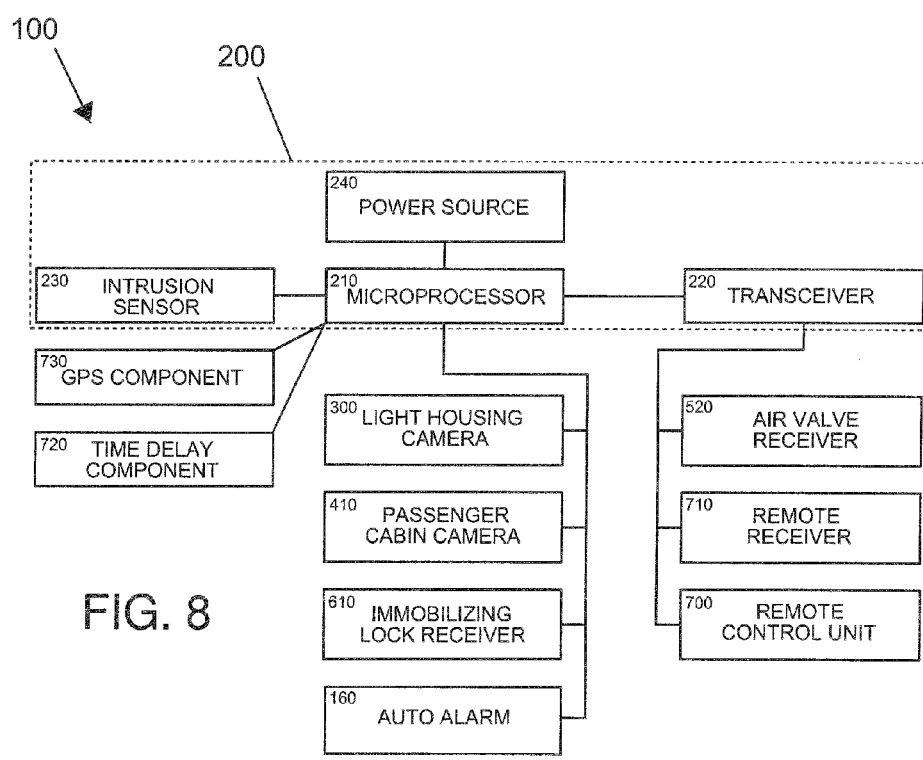
FIG. 8 is a schematic view of the present invention.
Figure 9:
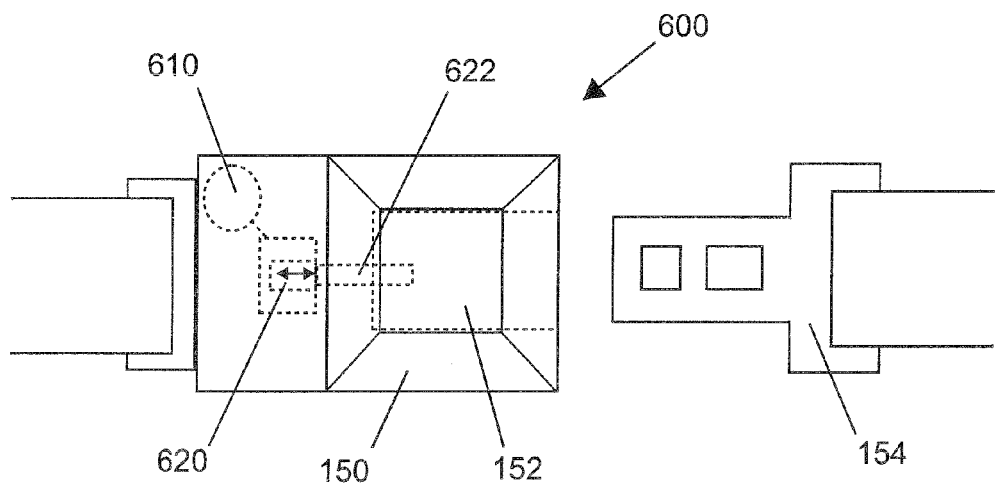
FIG. 9 is a top view of the automatic seatbelt immobilization lock of the present invention.
Figure 10:
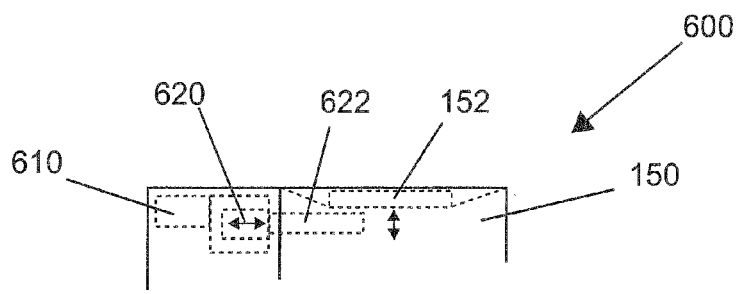
FIG. 10 is a side view of the automatic seatbelt immobilization lock of the present invention.
Figure 11:
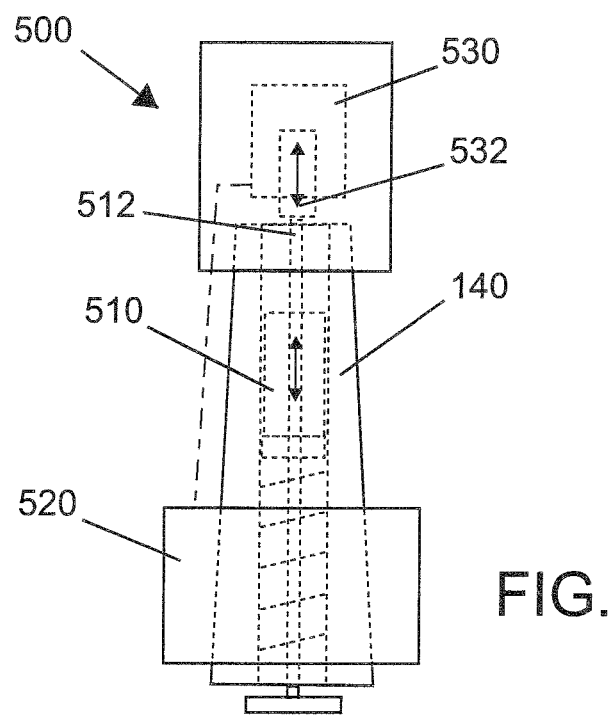
FIG. 11 is a side view of the automatic release air valve of the present invention.

Following is a list of elements corresponding to a particular element referred to herein:
- 100 Security monitoring, theft (and vandalism) prevention, and recovery system
- 110 Automobile
- 120 Passenger cabin
- 122 Passenger cabin anterior end
- 124 Passenger cabin posterior end
- 130 Wheel and tire assembly
- 140 Valve stem
- 150 Seatbelt latch
- 152 Seatbelt latch button
- 154 Seatbelt tongue
- 160 Automobile alarm
- 200 Control system
- 210 Microprocessor
- 220 Transceiver
- 230 Intrusion sensor
- 240 Power source
- 300 Exterior light housing camera
- 302 Camera lens
- 310 Exterior light housing
- 312 Exterior light housing transparent or translucent window
- 400 Interior passenger cabin camera bar
- 410 Interior passenger cabin camera
- 412 Interior passenger cabin camera bar transparent or translucent window
- 500 Automatic release air valve
- 510 Valve core
- 512 Sliding valve rod
- 520 Air valve receiver
- 530 Air valve actuator
- 532 Air valve engagement rod 600 Automatic seatbelt immobilizing lock
610 Immobilizing lock receiver
620 Immobilizing lock actuator
622 Immobilizing lock engagement rod
700 Remote control unit
710 Remote receiver
720 Time delay component
730 Global positioning satellite (GPS) locating component Referring now to FIG. 1-11, the present invention features a security monitoring, theft (and vandalism) prevention, and recovery system (100) for an automobile (110) that captures video footage of a perpetrator and surrounding landmarks during a theft, restricts the mobility of the automobile (110) and restrains the perpetrator. In some embodiments, the system (100) comprises an automobile (110) having a passenger cabin (120) with a passenger cabin anterior end (122) and a passenger cabin posterior end (124), a wheel and tire assembly (130) having a valve stem (140), an exterior light housing (310) having an exterior light housing transparent or translucent window (312), and a seatbelt latch (150).

In some embodiments, the system (100) comprises a control system (200) having a microprocessor (210), a transceiver (220), an intrusion sensor (230), and a power source (240). In some embodiments, the microprocessor (210) is operatively connected to the power source (240). In some embodiments, the transceiver (220) is operatively connected to the microprocessor (210). In some embodiments, the intrusion sensor (230) is operatively connected to the microprocessor (210). Security control systems are well known to those with ordinary skill in the art.

In some embodiments, the system comprises an automobile alarm (160). In some embodiments, the automobile alarm (160) was a pre-existing installation on the automobile (110). In some embodiments, the automobile alarm (160) is operatively connected to the control system (200). In some embodiments, the automobile alarm (160) activates the control system (200). In some embodiments, the control system activates the automobile alarm (160). In some embodiments, the system (100) operates independently from and is not connected to the automobile alarm (160). Automobile alarm systems are well known to those with ordinary skill in the art.

In some embodiments, the system (100) comprises an exterior light housing camera (300) located in the exterior light housing (310). In some embodiments, a camera lens (302) of the exterior light housing camera (300) is located close to the exterior light housing transparent or translucent window (312) for capturing a video image. In some embodiments, the exterior light housing camera (300) is operatively connected to the microprocessor (210). In some embodiments, the exterior light housing camera (300) is activated via a signal from the control system (200). In some embodiments, the exterior light housing camera (300) is a pan, tilt, zoom camera. In some embodiments, the exterior light housing camera (300) is hidden from view, or camouflaged. Surveillance cameras are well known to those with ordinary skill in the art.

In some embodiments, the system (100) comprises an interior passenger cabin camera bar (400) having an interior passenger cabin camera (410) located within. In some embodiments, the camera lens (302) of the interior passenger cabin camera (410) is located close to an interior passenger cabin camera bar transparent or translucent window (412) for capturing a video image. In some embodiments, the interior passenger cabin camera bar (400) is located inside the passenger cabin (120). In some embodiments, the interior passenger cabin camera (410) is operatively connected to the microprocessor (210). In some embodiments, the interior passenger cabin camera (410) is activated to capture a video image via a signal from the control system (200).

In some embodiments, the interior passenger cabin camera bar (400) is disposed on an interior roof of the passenger cabin (120). In some embodiments, the interior passenger cabin camera bar (400) is between about 1 inch and about 6 inches in length. In some embodiments, the interior passenger cabin camera bar (400) is between about 6 inches and about 12 inches in length. In some embodiments, the interior passenger cabin camera bar (400) is between about 12 inches and about 24 inches in length. In some embodiments, the interior passenger cabin camera bar (400) is between about 24 inches and about 36 inches in length. In some embodiments, the interior passenger cabin camera bar (400) is between about 36 inches and about 48 inches in length. In some embodiments, the interior passenger cabin camera bar (400) is greater than about 48 inches in length.

In some embodiments, the interior passenger cabin camera bar (400) is between about 1 inch and about 2 inches in width. In some embodiments, the interior passenger cabin camera bar (400) is between about 2 inches and about 4 inches in width. In some embodiments, the interior passenger cabin camera bar (400) is greater than about 4 inches in width.

In some embodiments, the system (100) comprises an automatic release air valve (500) located on the valve stem (140). In some embodiments, the automatic release air valve (500) comprises a valve core (510) (i.e. a Schrader, or American, valve having a poppet valve assisted by a spring with a sliding valve rod (512) that projects out and away from the top of the valve stem (140), an air valve receiver (520) operatively connected to an air valve actuator (530) having an air valve engagement rod (532), a power supply operatively connected to the air valve actuator (530), and a power supply operatively connected to the air valve receiver (520).

In some embodiments, the automatic release air valve (500) is activated to release pressurized air located within the wheel and tire assembly (130) via a wireless (radio frequency) signal from the transceiver (220) to the air valve receiver (520). In some embodiments, the air valve actuator (530) activates the valve core (510) poppet valve to release pressurized air located within the wheel and tire assembly (130) via the air valve engagement rod (532) of the air valve actuator (530) moving toward, engaging, and depressing the sliding valve rod (512) of the valve core (510).

In some embodiments, the air valve actuator (530) attaches to a valve stem (140). In some embodiments, the air valve actuator (530) attaches to a valve stem (140) via threads disposed close to a top end. In some embodiments, the air valve actuator (530) contains a power supply. In some embodiments, the air valve receiver (520) contains a power supply. In some embodiments, the air valve receiver (520) attaches to a valve stem (140). In some embodiments, the air valve receiver (520), the air valve actuator (530) and the power supply are connected together into a single unit. In some embodiments, the air valve receiver (520), the air valve actuator (530) and the power supply are attached to an existing valve stem (140). In some embodiments, a part of the automatic air release valve (500) projects above the valve stem (140). In some embodiments, a part of the automatic air release valve (500) is located on and surrounds the valve stem (140). Automobile valve stems (140) and valve cores (510) are well known to those with ordinary skill in the art. Actuated valves are well known to those with ordinary skill in the art.

In some embodiments, the system (100) comprises an automatic seatbelt immobilizing lock (600) located inside the seatbelt latch (150). In some embodiments, the automatic seatbelt immobilizing lock (600) is operatively connected to the microprocessor (210) or the control system (200). In some embodiments, the automatic seatbelt immobilizing lock (600) is operatively connected to the power source (240). In some embodiments, the automatic seatbelt immobilizing lock (600) contains a power source (240). In some embodiments, the automatic seatbelt immobilizing lock (600) comprises an immobilizing lock receiver (610), and an immobilizing lock actuator (620) having an immobilizing lock engagement rod (622). In some embodiments, the immobilizing lock receiver (610) is operatively connected to the immobilizing lock actuator (620). In some embodiments, the seatbelt immobilizing lock is activated to engage (and prohibit release of) the seatbelt latch (150) via a signal from the control system (200) to the immobilizing lock receiver (610). In some embodiments, the immobilizing lock actuator (620) displaces the immobilizing lock engagement rod (622) by being displaced into an extended position to block movement of the seatbelt latch button (152) (by sliding underneath the button) and thus prohibits the release of the seatbelt tongue (154) from the seatbelt latch (150). The immobilizing lock engagement rod (622) returns to a retracted position upon receiving a signal from the control system (200). Seat belt assemblies are well known to those with ordinary skill in the art. Spring loaded actuated latch assemblies are well known to those with ordinary skill in the art.

In some embodiments, upon detection of an invasive activity, the intrusion sensor (230) provides a signal to the microprocessor (210). In some embodiments, the exterior light housing camera (300) and the interior passenger cabin camera (410) are activated by the microprocessor (210) to provide a video signal thereto. In some embodiments, the automatic release air valve (500) and the automatic seatbelt immobilizing lock (600) are activated by the microprocessor (210) to release air pressure from the wheel and tire assembly (130) and immobilize the seatbelt latch (150), respectively.

In some embodiments, the control system (200) further comprises a remote control unit (700) for activating the microprocessor (210) via the transceiver (220).

In some embodiments, the control system (200) transmits a signal to a remote receiver (710) via the transceiver (220).

In some embodiments, the control system (200) comprises a time delay component (720) located within the microprocessor (210). In some embodiments, the exterior light housing camera (300), the interior passenger cabin camera (410), the automatic release air valve (500), and the automatic seatbelt immobilizing lock (600) are activated in a delayed sequence via a time delay component (720).

In some embodiments, the control system (200) comprises a global positioning satellite (GPS) locating component (730) operatively connected to the microprocessor (210). In some embodiments, the transceiver (220) receives a signal from the global positioning satellite locating component (730). In some embodiments, the transceiver (220) transmits a signal to a remote receiver (710) (coordinate information) from the global positioning satellite locating component (730). GPS systems are well known to those with ordinary skill in the art.

In some embodiments, the control system (200) is operatively connected to the automobile alarm (160).

In some embodiments, the control system (200) comprises a plurality of intrusion sensors (230) operatively connected thereto. In some embodiments, the intrusion sensor (230) is a photoelectric sensor. In some embodiments, the intrusion sensor (230) is an infrared sensor. In some embodiments, the intrusion sensor (230) is a shock sensor. In some embodiments, the intrusion sensor (230) is a glass breaking sensor. In some embodiments, the intrusion sensor (230) is a microwave sensor. In some embodiments, the intrusion sensor (230) is a motion sensor. In some embodiments, the intrusion sensor (230) is an infrasonic sensor. Intrusion sensors are well known to those with ordinary skill in the art.

In some embodiments, the power source (240) is the battery of the automobile (110). In some embodiments, the power source (240) is separate from the battery of the automobile (110). In some embodiments, the power source (240) is a rechargeable battery system that includes a battery charger.

In some embodiments, the exterior light housing camera (300) is located in an anterior exterior light (head lamp) housing (310). In some embodiments, a first exterior light housing camera (300) is located in a first anterior exterior light (head lamp) housing (310), and a second exterior light housing camera (300) is located in a second anterior exterior light housing (310).

In some embodiments, the exterior light housing camera (300) is located in a posterior exterior light (tail lamp) housing (310). In some embodiments, a first exterior light housing camera (300) is located in a first posterior exterior light (tail lamp) housing (310), and a second exterior light housing camera (300) is located in a second posterior exterior light housing (310).

In some embodiments, the interior passenger cabin camera bar (400) is located in the passenger cabin anterior end (122). In some embodiments, the interior passenger cabin camera bar (400) is located in the passenger cabin posterior end (124).

In some embodiments, the interior passenger cabin camera bar (400) comprises a plurality of interior passenger cabin cameras (410). In some embodiments, each interior passenger cabin camera (410) is uniquely positioned to capture a video image from inside or outside the passenger cabin (120). In some embodiments, the interior passenger cabin camera bar (400) resembles a bar or a strip shape and has a profile that projects less than 1 inch from the mounting surface. In some embodiments, the interior passenger cabin camera bar (400) resembles a bar or a strip shape and has a profile that projects less than 2 inches from the mounting surface. In some embodiments, the interior passenger cabin camera bar (400) resembles a bar or a strip shape and has a profile that projects less than 3 inches from the mounting surface. In some embodiments, the interior passenger cabin camera bar (400) resembles a bar or a strip shape and has a profile that projects less than 4 inches from the mounting surface.

In some embodiments, the interior passenger cabin camera bar (400) is constructed from a flexible material and is flexible to conform to the mounting surface. In some embodiments, the interior passenger cabin camera bar (400) is bendable to align with the windshield or the back window of the automobile for mounting. In some embodiments, the interior passenger cabin camera (410) is a pan, tilt, zoom camera. In some embodiments, the interior passenger cabin camera (410) is hidden from view, or camouflaged.

As used herein, the term "about" refers to plus or minus 10% of the referenced number. For example, an embodiment wherein the interior passenger cabin camera bar is about 10 inches in length includes an interior passenger cabin camera bar that is between 9 and 11 inches in length.

The disclosures of the following U.S. Patents are incorporated in their entirety by reference herein: U.S. Pat. Pub. No. 2008/0316314; U.S. Pat. Pub. No. 2008/0002027; U.S. Pat. Pub. No. 2003/0071899; U.S. Pat. No. 6,768,420; U.S. Pat. No. 5,027,104; U.S. Pat. No. 4,843,463; U.S. Pat. No. 4,772,375; U.S. Pat. No. 4,651,114.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A security monitoring, theft prevention, and recovery system for an automobile that captures video footage of a perpetrator and surrounding landmarks during a theft, restricts the mobility of the automobile and restrains the perpetrator, wherein said system comprises:
    (a) an automobile comprising a passenger cabin having a passenger cabin anterior end and a passenger cabin posterior end, a wheel and tire assembly having a valve stem, an exterior light housing having an exterior light housing transparent or translucent window, and a seatbelt latch
    (b) a control system having a microprocessor, a transceiver, an intrusion sensor, and a power source, wherein the microprocessor is operatively connected to the power source, wherein the transceiver is operatively connected to the microprocessor, wherein the intrusion sensor is operatively connected to the microprocessor;
    (c) an exterior light housing camera disposed in the exterior light housing, wherein a camera lens of the exterior light housing camera is disposed proximal to the exterior light housing transparent or translucent window for capturing a video image, wherein the exterior light housing camera is operatively connected to the microprocessor, wherein the exterior light housing camera is activated via a signal from the control system;
    (d) an interior passenger cabin camera bar having an interior passenger cabin camera disposed within, wherein the camera lens of the interior passenger cabin camera is disposed proximal to an interior passenger cabin camera bar transparent or translucent window for capturing a video image, wherein the interior passenger cabin camera bar is disposed inside the passenger cabin, wherein the interior passenger cabin camera is operatively connected to the microprocessor, wherein the interior passenger cabin camera is activated to capture a video image via a signal from the control system;
    (e) an automatic release air valve disposed on the valve stem, wherein the automatic release air valve comprises a valve core disposed in the valve stem having a sliding air valve rod and an air valve receiver operatively connected an air valve actuator having an air valve engagement rod, wherein a power source is operatively connected to the air valve receiver and the air valve actuator, wherein the automatic release air valve is activated to release pressurized air disposed within the wheel and tire assembly via a wireless signal from the transceiver to the air valve receiver, wherein the air valve actuator activates the valve core to release pressurized air located within the wheel and tire assembly via the air valve engagement rod of the air valve actuator activating the sliding valve rod of the valve core;
    (f) an automatic seatbelt immobilizing lock disposed in the seatbelt latch, wherein the automatic seatbelt immobilizing lock is operatively connected to a power source, wherein the automatic seatbelt immobilizing lock comprises an immobilizing lock receiver operatively connected to an immobilizing lock actuator having an immobilizing lock engagement rod, wherein the automatic seatbelt immobilizing lock is operatively connected to the control system, wherein the seatbelt immobilizing lock is activated to engage and prohibit release of the seatbelt latch via a signal from the control system to the immobilizing lock receiver, wherein upon activation, the immobilizing lock engagement rod is displaced into an extended position to block movement of a seat belt latch button for releasing a seatbelt, thus preventing release of a seatbelt tongue from the seatbelt latch;
    wherein upon detection of an invasive activity, the intrusion sensor provides a signal to the microprocessor, wherein the exterior light housing camera and the interior passenger cabin camera are activated by the microprocessor to provide a video signal thereto, wherein the automatic release air valve and the automatic seatbelt immobilizing lock are activated by the microprocessor to release air pressure from the wheel and tire assembly and immobilize the seatbelt latch, respectively;
    wherein the security monitoring, theft prevention, and recovery system for the automobile captures video footage of the perpetrator and surrounding landmarks during the theft, restricts mobility of the automobile, and restrains the perpetrator.

2. The system of claim 1, wherein the control system further comprises a remote control unit for activating the microprocessor via the transceiver.

3. The system of claim 1, wherein the control system transmits a signal to a remote receiver via the transceiver.

4. The system of claim 1, wherein the control system comprises a time delay component disposed within the microprocessor, wherein the exterior light housing camera, the interior passenger cabin camera, the automatic release air valve, and the automatic seatbelt immobilizing lock are activated in a delayed sequence via the time delay component.

5. The system of claim 1, wherein the control system comprises a global positioning satellite (GPS) locating component operatively connected to the microprocessor, wherein the transceiver transmits a signal to a remote receiver (coordinate information obtained from the global positioning satellite locating component).

6. The system of claim 1, wherein the control system is operatively connected to an automobile alarm.

7. The system of claim 1, wherein the control system comprises a plurality of intrusion sensors operatively connected thereto.

8. The system of claim 1, wherein the power source is a battery of the automobile.

9. The system of claim 1, wherein the exterior light housing camera is disposed in an anterior exterior light housing.

10. The system of claim 1, wherein a first exterior light housing camera is disposed in a first anterior exterior light housing, and a second exterior light housing camera is disposed in a second anterior exterior light housing.

11. The system of claim 1, wherein the exterior light housing camera is disposed in a posterior exterior light (tail lamp) housing.

12. The system of claim 1, wherein a first exterior light housing camera is disposed in a first posterior exterior light housing, and a second exterior light housing camera is disposed in a second posterior exterior light housing.

13. The system of claim 1, wherein the interior passenger cabin camera bar is disposed in the passenger cabin anterior end.

14. The system of claim 1, wherein the interior passenger cabin camera bar is disposed in the passenger cabin posterior end.

15. The system of claim 1, wherein the interior passenger cabin camera bar comprises a plurality of interior passenger cabin cameras, wherein each interior passenger cabin camera is positioned to capture a video image from inside or outside the passenger cabin.

\* \* \* \* \*